United States Patent
Hoshino et al.

(10) Patent No.: US 7,027,117 B2
(45) Date of Patent: Apr. 11, 2006

(54) LIQUID CRYSTAL DISPLAY APPARATUS

(75) Inventors: Koichi Hoshino, Saitama (JP); Makoto Arai, Tokorozawa (JP); Kazuhiro Okada, Saitama (JP); Takeru Yoshino, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 62 days.

(21) Appl. No.: 10/497,704

(22) PCT Filed: Dec. 2, 2002

(86) PCT No.: PCT/JP02/12606

§ 371 (c)(1),
(2), (4) Date: Jun. 4, 2004

(87) PCT Pub. No.: WO03/048851

PCT Pub. Date: Jun. 12, 2003

(65) Prior Publication Data

US 2005/0179828 A1   Aug. 18, 2005

(30) Foreign Application Priority Data

Dec. 7, 2001   (JP) .............................. 2001-374727

(51) Int. Cl.
   *G02F 1/1335*   (2006.01)
(52) U.S. Cl. .................................................... 349/114
(58) Field of Classification Search ................. 349/114
   See application file for complete search history.

(56) References Cited

U.S. PATENT DOCUMENTS 4,988,837 A * 1/1991 Murakami et al. ....... 178/18.07
5,728,251 A * 3/1998 Check, III .................. 359/253
2004/0160657 A1* 8/2004 Tonar et al. ................ 359/265
2005/0179828 A1* 8/2005 Hoshino et al. ............. 349/21

FOREIGN PATENT DOCUMENTS

| JP | 9-236815 | 9/1997 |
| JP | 2757380 | 3/1998 |
| JP | 11-52343 | 2/1999 |
| JP | 11-52364 | 2/1999 |
| JP | 11-101974 | 4/1999 |
| JP | 2001-75099 | 3/2001 |
| JP | 2001-147427 | 5/2001 |
| JP | 2001-209048 | 8/2001 |
| JP | 2001-255522 | 9/2001 |

* cited by examiner

*Primary Examiner*—James A. Dudek
(74) *Attorney, Agent, or Firm*—Westerman, Hattori, Daniels & Adrian, LLP

(57) ABSTRACT

In a liquid crystal display device including a liquid crystal display panel (10) including a liquid crystal layer (3) sandwiched between a first substrate (1) and a second substrate (2) having transparent electrodes (5, 6) on inner surfaces opposing to each other, the film thickness of at least one of the transparent electrodes (5, 6) formed on the first and second substrates (1, 2) is set so that light passing through the transparent electrode and exhibiting a maximum transmittance has a color within either a region defined by an x value of 0.22 to 0.28 and a y value of 0.21 to 0.31 or a region defined by an x value of 0.28 to 0.34 and a y value of 0.22 to 0.35 in a chromaticity diagram of a CIE 1931 color system using a white light source. This reduces coloring irregularities due to a film thickness error caused during manufacturing of the transparent electrodes to enable performance of uniform display.

7 Claims, 4 Drawing Sheets

LIQUID CRYSTAL DISPLAY APPARATUS

TECHNICAL FIELD

The invention relates to a liquid crystal display device which includes a liquid crystal display panel including a liquid crystal layer sandwiched between a pair of substrates having transparent electrodes formed respectively on inner surfaces opposing to each other.

BACKGROUND TECHNOLOGY

Conventionally, liquid crystal display devices which perform image display through use of liquid crystal have been extensively used in a wide range from small portable devices such as timepieces, personal digital assistants, cellular phones, and so on to relatively large display devices such as display televisions and so on.

The liquid crystal display device as described above includes a liquid crystal display panel made by bonding together a pair of substrates each having transparent electrodes formed on one surface, in such a manner that the transparent electrodes are opposed to each other, and including a liquid crystal layer sealed in the gap therebetween.

In performing display, a display signal is applied between the opposing transparent electrodes to apply voltage to the liquid crystal layer, thereby changing its optical property to change transmission, scattering and polarization properties and so on of light for each predetermined region. Such a liquid crystal display panel is combined with optical members such as a polarizing film, a retardation film, a reflector, and so on, thereby allowing the optical change of the liquid crystal layer to be recognized as brightness/darkness, scattering/transmission, or the like of display. If a color filter is additionally combined therewith, color display is also made possible.

The liquid crystal display device as described above does not emit light itself and therefore utilizes light which passes through liquid crystal cells to perform display.

The ways of utilizing light include, for example, a reflection type that utilizes external light incident from the visible side and a transmission type that utilizes a backlight that is an auxiliary light source provided on the opposite side to the visible side of the liquid crystal display panel, and a transflective liquid crystal display device capable of utilizing both of them is also known.

Incidentally, display in the liquid crystal display device is more preferably uniform as much as possible other than changes such as brightness/darkness, scattering/transmission, or the like which is generated by optical change in the liquid crystal layer. On the other hand, the liquid crystal display devices of both the transmission-type and the reflection-type perform display by utilizing light passing through the liquid crystal display panel, and therefore the display is necessarily affected not only by the liquid crystal layer but also by the optical members in the liquid crystal display panel.

As the material of the transparent electrodes essential for the liquid crystal display panel, ITO (Indium Tin Oxide) is mainly used, which will be an optical member affecting display because ITO is different in refractive index from the substrate. When ITO films, for example, with various film thicknesses are formed on a glass substrate and coloring thereof is measured, coloring in various colors in accordance with the film thickness appear as shown in the chromaticity diagram in FIG. 7. Therefore, nonuniform film thickness will cause coloring irregularities in display. It should be noted that FIG. 7 is obtained by plotting, in the chromaticity diagram of the CIE (Commission Internationale de l'Eclairage) 1931 color system, colors of transmitted light when ITO films having a film thickness of 0 to 400 nm are formed, in increments of 10 nm, on the glass substrate via a silicon dioxide ($SiO_2$) film having a film thickness of 25 nm and light generated by a D65 light source that is a white light source close to sunlight is applied thereto.

The transparent electrode made of ITO, however, desirably has a film thickness on the order of several hundreds Å to several thousands Å from its necessary resistance value, but it is difficult to form an ITO film having a film thickness of this level in terms of cost. Accordingly, there has been a problem that coloring with irregularities due to the transparent electrode appears so that sufficiently uniform display cannot be performed in a conventional liquid crystal display device.

In addition, to perform clear display, occurrence of coloring itself is not preferable. In particular, in the case of performing color display using a color filter, there has been a problem that the display color created by the color filter cannot be accurately set when coloring is caused by other optical members.

An object of the invention is to solve the above-described problems so as to reduce the coloring irregularities and enable performance of uniform display in a liquid crystal display device. Further, another object is to enable performance of display without coloring.

DISCLOSURE OF THE INVENTION

In order to achieve the above objects, the invention is a liquid crystal display device including a liquid crystal display panel including a liquid crystal layer sandwiched between a first substrate on a visible side and a second substrate on an opposite side to the visible side having transparent electrodes on inner surfaces opposing to each other, wherein a transflective film formed of a dielectric multilayered film made by alternately layering a high refractive index film and a low refractive index film is provided between the second substrate and the transparent electrode on the second substrate, wherein at least one of the transparent electrodes formed on the first and second substrates is colored, and wherein spectroscopic characteristics within a visible region of a reflected light or a transmitted light by the transflective film are almost flat through correction of coloring of light transmitted through the at least one transparent electrode.

In the liquid crystal display device described above, it is preferable that a film thickness of the at least one of transparent electrodes is set so that light passing through the transparent electrode and exhibiting a maximum transmittance has a color within either a region defined by an x value of 0.22 to 0.28 and a y value of 0.21 to 0.31 or a region defined by an x value of 0.28 to 0.34 and a y value of 0.22 to 0.35 in a chromaticity diagram of a CIE 1931 color system using a white light source.

Further, it is preferable that a first light control layer having optical anisotropy is provided on the opposite side to the liquid crystal layer of the first substrate, and the first light control layer has a characteristic of correcting coloring of light emitted from the liquid crystal display panel to make spectroscopic characteristics thereof within a visible region almost flat.

Further, it is preferable that an auxiliary light source placed on the opposite side to the liquid crystal layer of the second substrate, and a second light control layer having optical anisotropy placed between the auxiliary light source and the second substrate, are provided respectively, wherein either or both of the auxiliary light source and the second light control layer has/have a characteristic of correcting coloring of transmitting light emitted from a light source and transmitting through the liquid crystal display panel and the first 10 light control layer to make spectroscopic characteristics within the visible region of the transmitting light almost flat.

Besides, it is preferable that the at least one transparent electrode is a transparent electrode formed on the second substrate.

Otherwise, it is preferable that the at least one transparent electrode is 1600 Å to 2000 Å in film thickness.

Alternatively, it is also adoptable that the at least one transparent electrode is 2600 Å to 3000 Å in film thickness.

BEST MODE FOR CARRYING OUT THE INVENTION

Preferred embodiments of the invention will be described below with reference to the drawings.

Figure 1:
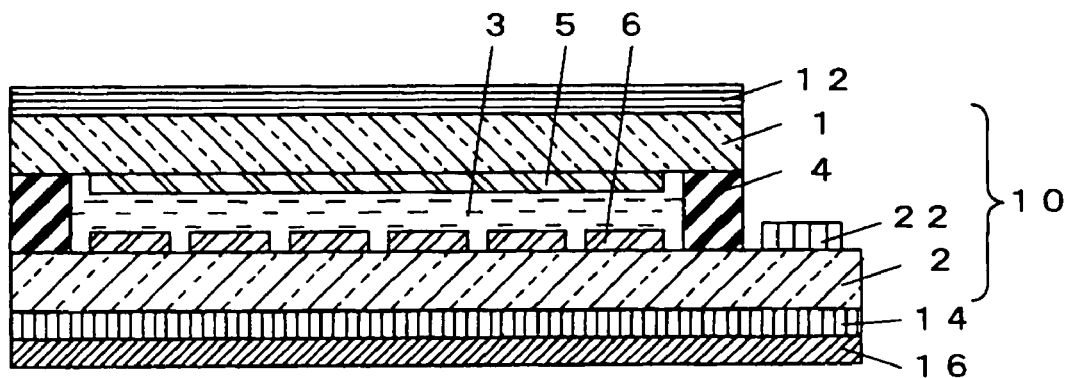
FIG. 1 is a cross-sectional view schematically showing a configuration of a liquid crystal display device of a first embodiment of the invention.
Figure 7:
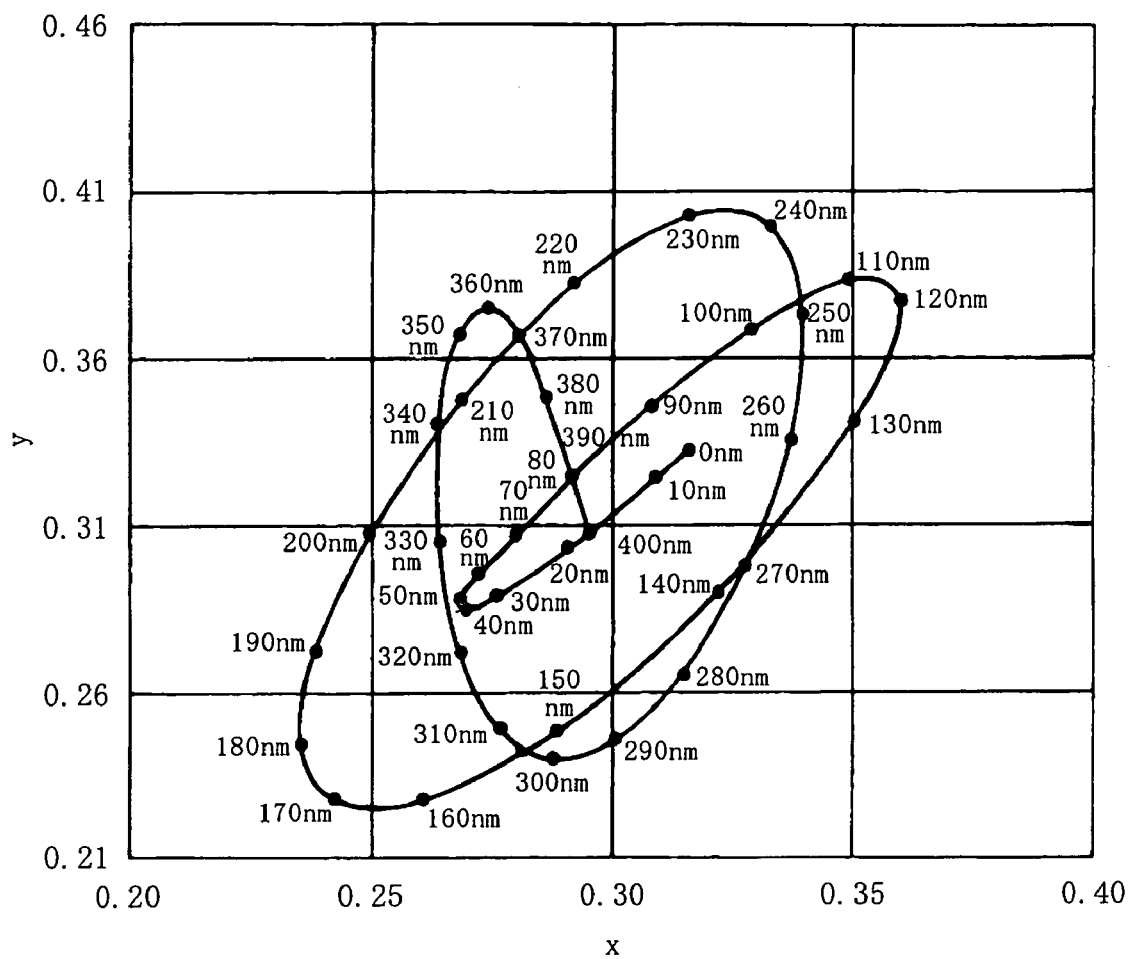
FIG. 7 is a diagram made by plotting in a chromaticity diagram of a CIE 1931 color system colors of transmitted light when ITO films with various film thicknesses are formed on a glass substrate via a $SiO_2$ film.

First Embodiment: FIG. 1 and FIG. 7

First, a first embodiment of a liquid crystal display device of the invention will be described. FIG. 1 is a cross-sectional view showing a configuration of the liquid crystal display device. Note that, in this drawing, respective constituting members are shown with their thicknesses and spacing therebetween substantially enlarged.

As shown in FIG. 1, this liquid crystal display device comprises a liquid crystal display panel 10; a first polarizing film 12 placed on its visible side (the upper side in the drawing); a second polarizing film 14 placed on the opposite side to the visible side (the lower side in the drawing) of the liquid crystal display panel 10; a reflective film 16 placed on the opposite side to the visible side of the second polarizing film 14; and a liquid crystal driving IC 22 provided on a second substrate 2. It is a reflection-type liquid crystal display device utilizing external light that is incident from the visible side.

The liquid crystal display panel 10 is made by bonding together a first substrate 1 and the second substrate 2, which are made of transparent insulation material such as glass respectively, with a sealant 4 provided at their peripheries, and has a liquid crystal layer 3 sandwiched therebetween. On opposing inner surfaces of the first and second substrates 1 and 2, first and second electrodes 5 and 6 made of indium tin oxide (ITO) or the like are formed, respectively, in stripes perpendicular to each other, so that each portion where the first and second electrodes 5 and 6 planarly overlap each other forms a pixel portion.

The liquid crystal layer 3 is composed of twisted nematic (TN) liquid crystal with a twist angle of 90 degrees. Further, a not-shown alignment film is provided on each of the substrates 1 and 2 and electrodes 5 and 6 on the side in contact with the liquid crystal layer 3 and subjected to alignment treatment so that liquid crystal molecules are aligned in predetermined directions.

The first polarizing film 12 placed on the visible side of the liquid crystal display panel 10, which is an absorption-type polarizing film, is a member in a shape of a sheet which transmits linearly polarized light in the direction parallel to the transmission axis and absorbs linearly polarized light in the direction of the absorption axis orthogonal to the transmission axis. The second polarizing film 14 placed on the opposite side to the visible side of the liquid crystal display panel 10 is also the absorption-type polarizing film similar to the first polarizing film 12. The first polarizing film 12 constitutes a first light control layer and the second polarizing film 14 constitutes a second light control layer here.

The reflective film 16 is a mirror-surface reflective film made of metal such as silver or aluminum and reflects almost all of incident light within the overall wavelength range of visible light.

In this device, the first polarizing film 12 is placed such that its transmission axis is parallel to the direction of the long axis of the liquid crystal molecules on the visible side in the liquid crystal layer 3 of the liquid crystal display panel 10. Besides, the second polarizing film 14 is placed such that its transmission axis is parallel to the direction of the long axis of the liquid crystal molecules on the opposite side to the visible side in the liquid crystal layer 3 of the liquid crystal display panel 10. Accordingly, the transmission axis of the first polarizing film 12 and the transmission axis of the second polarizing film 14 are orthogonal to each other.

The directions of the stripes in the first polarizing film 12 and the second polarizing film 14 in FIG. 1 show the directions of the respective transmission axes, the horizontal stripes in the first polarizing film 12 showing the direction parallel to the paper surface and the vertical stripes in the second polarizing film 14 showing the direction perpendicular to the paper surface.

The liquid crystal display device thus configured can perform display by applying driving signals from the liquid crystal driving IC (integrated circuit) 22 to the first and second electrodes 5 and 6 via not-shown connecting electrodes and controlling application or non-application of voltage to each pixel portion to change optical characteristics of the liquid crystal layer 3 for each pixel portion. Note that the connection from the liquid crystal driving IC 22 to the first electrodes 5 on the first substrate 1 can be established by forming at least a part of the sealant 4 by using of an anisotropic conductive adhesive that is made by mixing conductive particles into an insulating adhesive and electrically connecting the connecting electrode formed on the first substrate and the connecting electrode formed on the second substrate 2 through use of this anisotropic conductive adhesive.

The principle of display by this liquid crystal display panel will be further described here.

Half of the light, which is made incident on the liquid crystal display device from the visible side (the upper side in the drawing), is absorbed by the first polarizing film 12, and the other half is transmitted through the first polarizing film 12 to become linearly polarized light in the direction parallel to the paper surface and made incident on the liquid crystal display panel 10. The light then passes through members such as the first substrate 1, the first electrode 5, the liquid crystal layer 3, the second electrode 6, the second substrate 2, and so on and exits to the second polarizing film 14 side.

Since the liquid crystal layer 3 of the liquid crystal display panel 10 is the liquid crystal layer with a twist angle of 90° in which the long axis direction of the liquid crystal molecules on the visible side is parallel to the transmission axis of the first polarizing film 12 as described above, the linearly polarized light transmitted through the first polarizing film 12 passes through the liquid crystal display panel 10 with its polarization direction twisted 90 degrees to become perpendicular to the paper surface during the passing at a portion in the OFF state where no voltage is applied to the liquid crystal layer 3, and is made incident on the second polarizing film 14. Therefore, the linearly polarized light has the polarization direction that is the same as the direction of the transmission axis of the second polarizing film 14, and is therefore transmitted through the second polarizing film 14 and reflected by the reflective film 16 on the opposite side to the visible side. The light then passes through the path reversed to that during the incidence and exits to the visible side, so that the portion in the OFF state is recognized as display in mirror tone as seen from the visible side.

On the other hand, at a portion in the ON state where voltage is applied to the liquid crystal layer 3, the liquid crystal molecules rise to lose the twist, so that the linearly polarized light transmitted through the first polarizing film 12 passes through the liquid crystal display panel 10 without being twisted, and is made incident on the second polarizing film 14 with its polarization direction being kept in the direction parallel to the paper surface. Accordingly, since the polarization direction is orthogonal to the direction of the transmission axis of the second polarizing film 14, the linearly polarized light is absorbed by the second polarizing film 14. As a result, the reflected light hardly exits to the visible side, so that the portion in the ON state is recognized as black display as seen from the visible side.

As described above, in this liquid crystal display device, display can be performed, switched between the mirror tone and black, by controlling the application and non-application of voltage to the liquid crystal layer 3 in a unit of pixel.

Next, the film thickness of the electrode that is a characteristic of the invention will be described.

In this liquid crystal display device, the film thickness of the second electrode 6 formed on the second substrate 2 is set to a film thickness so that the color of light passing through the second electrode 6 becomes a color in the blue region within the luminosity range.

Since ITO used as the material of the second electrode 6 is different in refractive index from the substrate as described in Background Technology section, if the second electrode 6 is formed on the second substrate 2 that is a glass substrate, light passing through these members is subjected to coloring in various colors as shown in FIG. 7 in accordance with the film thickness of ITO used as the material of the second electrode 6. Note that FIG. 7 shows coloring when the ITO film is formed on the glass substrate via the SiO$_2$ film as described above, and the coloring is not different therefrom even though the ITO film is formed directly on the glass substrate.

On the other hand, the film thickness of the transparent electrode is desirably on the order of several hundreds Å to several thousands Å from a necessary resistance value, but when the ITO film with the film thickness of this level is desired to be formed at a low cost, an error on the order of ±10% from the target film thickness will occur. Accordingly, to eliminate irregularities of coloring due to the second electrode 6, it is necessary to set the film thickness in a range in which color does not greatly change even when the error at this level occurs in the film thickness.

Referring again to the plot in the chromaticity diagram in FIG. 7 here, it is found that the change in coloration of coloring when the film thickness is changed is relatively small in the case where the color of the transmitted light is a color within either the region defined by an x value of 0.22 to 0.28 and a y value of 0.21 to 0.31 (blue) or the region defined by an x value of 0.28 to 0.34 and a y value of 0.22 to 0.35 (purple to red), which are within the luminosity range (visible region).

In particular, it is found that the change in coloration of the coloring when the film thickness is changed can be made smaller when the electrode is formed in a film thickness of 1600 Å to 2000 Å so that the color of the transmitted light is a color within the blue region of the luminosity range and when the electrode is formed in a film thickness of 2600 Å to 3000 Å so that the color of the transmitted light is a color within the red region of the luminosity range. However, since with an increase in the film thickness of the electrode the transmittance accordingly decreases to cause display to be dark, and the manufacturing error in terms of film thickness also becomes larger, the former is more preferable in consideration of this viewpoint as well.

Although the film thickness of the second electrode 6 is set to 1800 Å so that the color of light passing through the second electrode 6 is a color in the blue region within the luminosity range to thereby reduce the coloring irregularities of light passing through the second electrode 6 in this liquid crystal display device, the same effect can be obtained even when the film thickness is set so that the color is a color in the region of purple or red.

This arrangement enables uniform display on the entire surface of the display region (the region where the electrodes are formed) of the liquid crystal display device. Further, even if the film thickness of the transparent electrode varies, for example, ±10% due to the manufacturing error, among many liquid crystal display devices manufactured, the coloring of the transparent electrode to which the invention is applied hardly varies, so that the display quality of the liquid crystal display device can be kept almost uniform.

Besides, when the coloring itself is desired to be eliminated, a color filter or the like of a color in complementary relation to the color added by the second electrode 6 can be provided to eliminate the coloring with ease. Further, in performing color display using color filters of red, (R), green (G), blue (B), and so on, setting of optical characteristics of each color filter for displaying an arbitrary color can be performed easily and accurately.

It should be noted that the setting of the film thicknesses of the electrodes on both the substrates as described above allows further improvement in terms of reduction in color irregularities, but the film thickness of the electrode to be formed on one of the first and second substrates 1 and 2 may be more effective in improving the display quality when it is set with emphasis placed on the characteristics such as the resistance value or the like of wiring pull around in the liquid crystal display panel 10 than when it is set at request from optical characteristics as described above. Hence, in this liquid crystal display device, the film thickness of the first electrode 5 is set to be 2200 Å with emphasis placed on the characteristics such as the resistance value or the like. The set film thickness enables the sheet resistance of ITO to be 10/sq that is the level at which there is no problem in terms of wiring resistance.

This arrangement can also provide sufficient effects of reducing the coloring irregularities by setting the film thickness of at least one of the transparent electrodes to be formed on the first and second substrates so that the color of light passing through the transparent electrode is a color in the region of blue, purple or red within the luminosity range.

It is needless to say that the same effects are provided even when the film thicknesses of the first and second electrodes 5 and 6 are reversed in this liquid crystal display device. Besides, while the example of the reflection-type liquid crystal display device using the two absorption-type polarizing films 12 and 14, the liquid crystal display panel 10 using the TN liquid crystal, and the reflective film 16 is described here, the invention is of course applicable to various liquid crystal display devices such as a transmission-type liquid crystal display device provided with an auxiliary light source in place of the reflective film 16, a liquid crystal display device using STN liquid crystal in place of the TN liquid crystal, a single polarizing film-type liquid crystal display device using a retardation film, an active matrix-type liquid crystal display device using thin film diodes or thin film transistors, a liquid crystal display device using scattering-type liquid crystal, and so on.

Second Embodiment: FIG. 2 to FIG. 5

Figure 2:
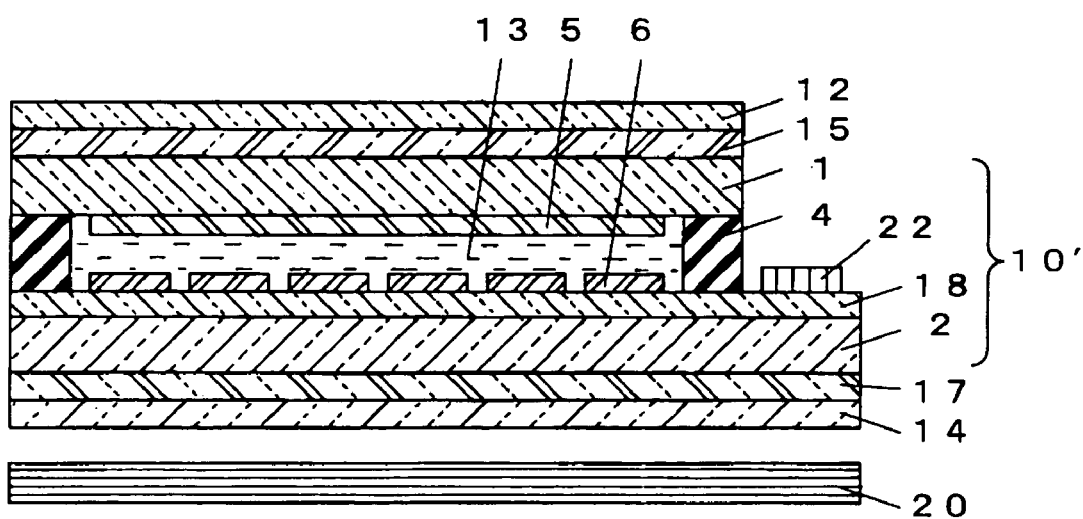
FIG. 2 is a cross-sectional view schematically showing a configuration of a liquid crystal display device of a second embodiment of the invention.
Figure 3:
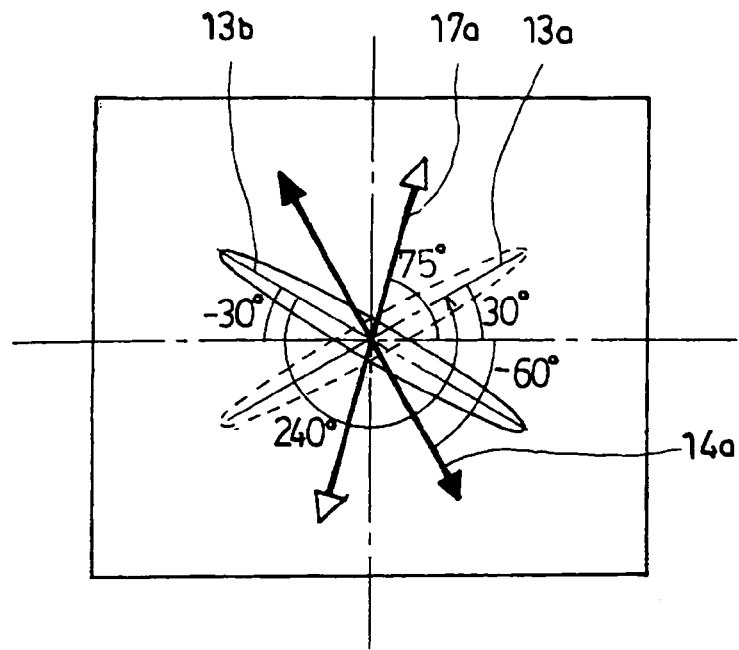
FIG. 3 is a diagram showing the planar positional relationship among members in the liquid crystal display device.
Figure 4:
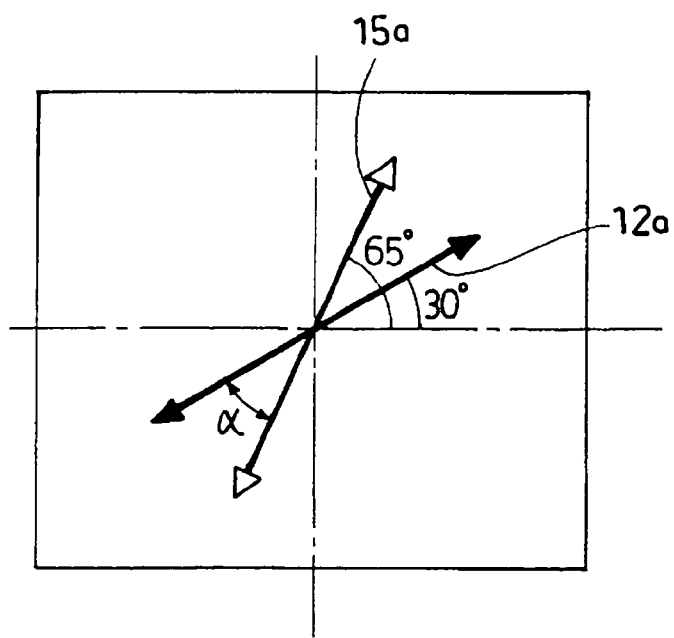
FIG. 4 is a similar diagram showing the planar positional relationship between other members.
Figure 5:
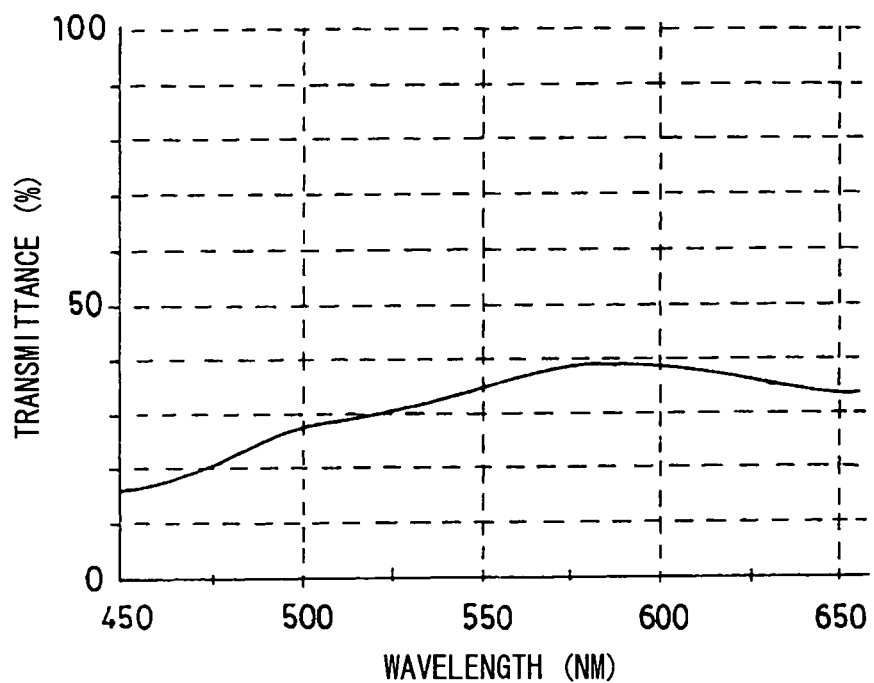
FIG. 5 is a graph showing spectroscopic characteristics of a dielectric multilayered film used in the liquid crystal display device.

Next, a second embodiment of a liquid crystal display device of the invention will be described. FIG. 2 is a cross-sectional view schematically showing a configuration of the liquid crystal display device, FIG. 3 and FIG. 4 are diagrams each showing the planar positional relationship among members in the liquid crystal display device, and FIG. 5 is a graph showing spectroscopic characteristics of a dielectric multilayered film used in the liquid crystal display device. Note that, in FIG. 2, respective constituting members are shown with their thicknesses and spacing therebetween substantially enlarged.

As shown in FIG. 2, this liquid crystal display device comprises a liquid crystal display panel 10'; a first retardation film 15 and a first polarizing film 12 which are sequentially placed on its visible side (the upper side in the drawing); a second retardation film 17, a second polarizing film 14, and a backlight 20 that is an auxiliary light source, which are sequentially placed on the opposite side to the visible side of the liquid crystal display panel 10'; and a liquid crystal driving IC 22 placed on a second substrate 2 of the liquid crystal display panel 10'.

The liquid crystal display panel 10' has a configuration in which a first substrate 1 and the second substrate 2, which are made of a glass plate with a thickness of 0.5 mm respectively, are bonded together with a sealant 4 provided at their peripheries, and a liquid crystal layer 13, which is composed of super twisted nematic (STN) liquid crystal aligned at a twist angle of 240° counterclockwise, fills a gap therebetween and sandwiched by the substrates.

Further, a transflective film 18, which is composed of a dielectric multilayered film made by alternately layering a high refractive index layer and a low refractive index layer, is formed as a reflective film on the entire surface on the visible side of the second substrate 2, and second electrodes 6 are formed directly thereon.

On an inner surface of the first substrate 1, first electrodes 5 are formed. The first and second electrodes 5 and 6 are both made of an indium tin oxide (ITO) film that is a transparent conductive film in stripes perpendicular to each other, so that each portion where the first electrode 5 and the electrode 6 planarly overlap each other forms a pixel portion.

An alignment film is formed on the first electrodes 5 including the inner surface of the first substrate 1, and on the second electrodes 6 including the transflective film 18, respectively, but their illustrations are omitted.

The transflective film 18 provided in this liquid crystal display device will be described in detail here.

The transflective film 18 is formed by alternately layering a high refractive index layer composed of a $TiO_2$ film having a refractive index of about 2.6 and a low refractive index layer composed of a $SiO_2$ film having a refractive index of about 1.2, which are in film thicknesses as shown in Table 1, and the total thickness is 6850 Å.

TABLE 1

| | Material | Film Thickness (Å) |
|---|---|---|
| | Visible side | |
| 1 | $SiO_2$ | 1200 |
| 2 | $TiO_2$ | 880 |
| 3 | $SiO_2$ | 830 |
| 4 | $TiO_2$ | 650 |
| 5 | $SiO_2$ | 980 |
| 6 | $TiO_2$ | 500 |
| 7 | $SiO_2$ | 420 |
| 8 | $TiO_2$ | 400 |
| 9 | $SiO_2$ | 840 |
| 10 | $TiO_2$ | 150 |
| | Second substrate 2 side | |

The dielectric multilayered film thus formed functions as a transflective film which transmits about 30% of incident light and reflects the other. It was found from the experiment by the present inventors that there is no remarkable peak within the visible region when the transmittance of light where the dielectric multilayered film as described above is formed on a glass substrate is plotted with respect to the wavelength of light as shown in FIG. 5, the spectroscopic characteristics of the transmitted light within the visible region being thus almost flat, and as a result, the dielectric multilayered film is an achromatic film. Since the reflected light is the other than the transmitted light, the spectroscopic characteristics of the reflected light within the visible region also necessarily become almost flat, so that it is achromatic reflected light. Note that colors generally used for display in the liquid crystal display device are colors having wavelengths ranging from 450 nm to 650 nm, and therefore the visible region is defined as this range in this description.

Since the dielectric multilayered film as described above is an insulator, the dielectric multilayered film when used as the transflective film 18 causes no short circuit between electrodes even when the electrodes are formed directly on the transflective film 18 via no protective film. Further, the dielectric multilayered film is also chemically stable and thus allows treatment under high humidity or high pressure conditions or use of strongly corrosive etchant when members such as electrodes, alignment films, color filters for performance of color display, and so on are formed, so that these members can be formed at low cost, resulting in reduced cost of the device.

However, when the dielectric multilayered film as described above is used as the transflective film 18 and the second electrodes 6 are formed directly thereon, there arises a problem of irregular coloring due to variation in the film thickness of the electrode, in particular, as described in Background Technology section and the first embodiment.

It is known that the greater the difference in refractive index between adjacent optical members is, the more remarkable the coloring becomes. As compared to the case in which the electrode made of the ITO film is formed directly on the glass substrate as in the first embodiment, in the case in which the electrode made of the ITO film is formed directly on the dielectric multilayered film as in this liquid crystal display device, the difference in refractive index between these members is greater and the coloring accordingly becomes more remarkable, resulting in more conspicuous irregularities therein as a matter of course. More specifically, the refractive index of glass is about 1.5 and the refractive index of ITO is about 1.7 to about 1.8, so that the difference in refractive index between these members is on the order of 0.2 to 0.3, while the refractive index of $SiO_2$ is about 1.2 and the refractive index of $TiO_2$ is about 2.6 as described above, so that the difference in refractive index between these and ITO is on the order of 0.5 to 0.6 or on the order of 0.8 to 0.9, and the coloring of ITO becomes accordingly more remarkable.

Besides, since the glass substrate transmits nearly 100% of light, coloring irregularities due to the variation in film thickness of ITO are masked with an abundance of light to become relatively inconspicuous. Besides, when a metal thin film is used as the transflective film, influence of coloring due to absorption of light with a specific wavelength by the metal thin film is great, so that the coloring irregularities due to the variation in film thickness of ITO also become relatively inconspicuous.

The dielectric multilayered film used here, however, utilizes only about 30% of the quantity of the incident light during transmission and about 70% of the quantity of the incident light during reflection, and has spectroscopic characteristics within the visible region which are almost flat characteristics, so that display will be greatly affected by coloring irregularities of ITO unlike the above-described case. Therefore, it is particularly important to reduce the coloring irregularities due to the variation in film thickness of ITO in the liquid crystal display device using the dielectric multilayered film as the transflective film as in this liquid crystal display device.

Hence, the film thickness of the second electrode 6 made of ITO is set to 1800 Å so that the color of light passing through the second electrode 6 is a color in the blue region within the luminous range as in the first embodiment to thereby decrease the coloration irregularities due to an error in film thickness of ITO caused during manufacturing. In addition to this, when the film thickness of the second electrode 6 is set to the value which is described in the first embodiment, the same effect can be obtained.

Besides, the film thickness of the first electrode 5 formed on the first substrate 1 is set to 2200 Å as in the first embodiment.

As for this point, as described in the first embodiment, the film thickness of one of the first electrode 5 and the second electrode 6 is often more effective in improving the display quality when it is set with emphasis placed on the characteristics such as the resistance value or the like. In addition, in the liquid crystal display device, since color irregularities due to the variation in the film thickness appear more remarkably by the second electrode 6 formed on the dielectric multilayered film than by the first electrode 5 formed on the glass substrate, the film thickness of the second electrode 6 is more effective in reducing the color irregularities as a whole when it is set at request from optical characteristics.

Note that some effect can be obtained even when the film thickness of the first electrode 5 is set at request from optical characteristics.

The description on the other members in the liquid crystal display device will be continued.

The first polarizing film 12 and the first retardation film 15 which are placed on the visible side of the liquid crystal display panel 10' are bonded together with an acrylic adhesive into one body and attached to the outer surface of the first substrate 1 of the liquid crystal display panel 10' with an acrylic adhesive. These first polarizing film 12 and the first retardation film 15 constitute a first light control layer having optical anisotropy.

The first polarizing film 12 is an absorption-type polarizing film similar to that in the first embodiment.

The first retardation film 15 is a transparent film with a thickness of about 70 μm made by stretching polycarbonate (PC) and has a retardation value R of 0.39 μm at a wavelength of 0.55 μm. As the first retardation film 15, a so-called Z-type retardation film which has a relation of nx>nz>ny where the refractive index in the slow axis direction is defined as nx, the refractive index in the direction orthogonal to the slow axis is defined as ny, and the refractive index in the thickness direction is defined as nz is used.

On the other hand, the second polarizing film 14 and the second retardation film 17 which are placed on the opposite side to the visible side of the liquid crystal display panel 10' are also bonded together with an acrylic adhesive into one body and attached to the outer surface of the second substrate 2 of the liquid crystal display panel 10'. These second polarizing film 14 and the second retardation film 17 constitute a second light control layer having optical anisotropy.

The second retardation film 17, which is one with a thickness of about 70 μm made by stretching polycarbonate, is a quarter-wave plate having a retardation value F3=0.14 μm at a wavelength of 0.55 μm.

The second polarizing film 14 is an absorption-type polarizing film similar to that in the first embodiment.

As the backlight 20, it is possible to use a light guide film with a fluorescent light or LED attached thereto or an electro luminescence (EL) plate, and an EL plate with a thickness of about 1 mm and white luminescent color is used in this embodiment.

Next, the planar positional relationship among these constituting members will be described using FIG. 3 and FIG. 4 as well.

Alignment films (not shown) are formed on the surfaces of the first electrodes 5 and the second electrodes 6 of the liquid crystal display device 10' shown in FIG. 2, and the one on the second substrate 2 side is subjected to rubbing treatment in the upper-right 30° direction with respect to the horizontal axis so that a lower molecular alignment direction 13a of liquid crystal in the liquid crystal layer 13 is +30°, and the other on the first substrate 1 side is subjected to rubbing treatment in the lower-right 30° direction so that an upper molecular alignment direction 13b of liquid crystal in the liquid crystal layer 13 is −30°.

An optical rotary material that is called a chiral material is added to the nematic liquid crystal with a viscosity of 20 cp which constitutes the liquid crystal layer 13, and a twist pitch P is adjusted to be 11 μm so that the twist direction is counterclockwise and a twist angle is 240°.

The difference Δn in birefringence of the nematic liquid crystal in use is 0.131, and the cell gap d that is the gap between the first substrate 1 and the second substrate 2 is set to 5.8 μm. Therefore, a Δnd value Rs which is expressed by the product of the difference Δn in birefringence of the nematic liquid crystal and the cell gap d, representing the birefringence of the liquid crystal display panel 10', is 0.76 μm.

An absorption axis 12a of the first polarizing film 12 is placed, as shown in FIG. 4, at +30° with respect to the horizontal axis. A slow axis 15a of the first retardation film 15 is placed at +65° with respect to the horizontal axis. This results in a crossing angle α between the absorption axis 12a of the first polarizing film 12 and the slow axis 15a of the first retardation film 15 of 35°.

A slow axis 17a of the second retardation film 17 which is placed on the opposite side to the visible side of the liquid crystal display panel 10' is placed, as shown in FIG. 3, at +75° with respect to the horizontal axis, and an absorption axis 14a of the second polarizing film 14 is placed at −60° with respect to the horizontal axis, so as to be orthogonal to the absorption axis 12a of the first polarizing film 12.

Display operation of the liquid crystal display device in this embodiment will be described here.

This liquid crystal display device can also perform display, as in the first embodiment, by applying driving signals from the liquid crystal driving IC 22 to the first and second electrodes 5 an 6 via not-shown connecting electrodes and controlling application or non-application of voltage to each pixel portion to change optical characteristics of the liquid crystal layer 3 for each pixel portion. The way of connection is also the same as in the first embodiment.

The linearly polarized light incident on the liquid crystal display device from the visible side and passing through the first polarizing film 12 is transmitted through the first retardation film 15 and the liquid crystal layer 13 of the liquid crystal display panel 10', whereby light with all wavelengths within the visible region become circularly polarized light at portions where no voltage is applied to the liquid crystal layer 13. Since the second electrode 6 and the not-shown protective layer have no birefringency, the circularly polarized light reaches the transflective film 18 with the polarization state unchanged.

The circularly polarized light reflected by the transflective film 18 is transmitted again through the liquid crystal layer 13 and the first retardation film 15 to be returned to the linearly polarized light with the polarization direction rotated 90° and all absorbed by the first polarizing film 12, so that the reflectance is low within almost all the visible region, leading to excellent black display.

When a predetermined voltage is applied to the liquid crystal layer 13, the nematic liquid crystal molecules rise to decrease the substantial Δnd value of the liquid crystal display panel 10'. Accordingly, the linearly polarized light incident and passing through the first polarizing film 12 is not brought into fully circularly polarized light even after transmitted through the first retardation film 15 and the liquid crystal layer 13 but into elliptically polarized light or linearly polarized light.

Where the amount of birefringence occurring in the liquid crystal layer 13 due to the application of voltage is set to an equivalence of a quarter wavelength, the linearly polarized light incident through the first polarizing film 12 and reflected by the transflective film 18 returns as it is without rotation, so that the reflectance is high within almost all the visible region, leading to bright and excellent white display in mirror tone.

On the other hand, in the case of transmission display where the backlight 20 is turned on, the light emitted from the backlight 20 passes through the second polarizing film 14 to become linearly polarized light. This linearly polarized light is made incident at an angle of 45° with respect to the slow axis 17a of the second retardation film 17 to become circularly polarized light. Then, about 70% of the light is reflected by the transflective film 18 but the other 30% of the light is transmitted therethrough.

In the region where no voltage is applied to the liquid crystal layer 13, the resultant retardation value of the first retardation film 15 and the liquid crystal display panel 10' is a quarter wavelength at almost all wavelengths. Therefore, when the members are placed as in this liquid crystal display device, subtraction of the retardation generated by the second retardation film 17 from the resultant retardation of the liquid crystal display panel 10' and the first retardation film 15 results in zero, so that the light becomes linearly polarized light in the polarization direction parallel to the transmission axis of the second polarizing film 14 and exits from the first retardation film 15 and is made incident on the first polarizing film 12.

Since the absorption axis 12a of the first polarizing film 12 and the absorption axis 14a of the second polarizing film 14 are orthogonal to each other (therefore, the transmission axes thereof are also orthogonal to each other), the incident light cannot be transmitted through the first polarizing film 12, leading to black display.

When a predetermined voltage is applied to the liquid crystal layer 13, the nematic liquid crystal molecules rise to decrease the substantial Δnd value of the liquid crystal display panel 10'. Therefore, the linearly polarized light emitted from the backlight 20 and passing through the second polarizing film 14 is brought into circularly polarized light after passing through the second retardation film 17 and into elliptically polarized light or linearly polarized light after transmitted through the liquid crystal layer 13 and the first retardation film 15.

Where the retardation occurring in the liquid crystal display panel 10' due to the application of voltage is set to a quarter wavelength, the linearly polarized light incident through the second polarizing film 14 is further transmitted through the first retardation film 15 with the polarization direction being rotated by 90° and thus transmitted through the first polarizing film 12, leading to excellent white display.

As described above, this liquid crystal display device can perform display while switching between mirror tone and black when utilizing light incident from the visible side, and while switching between white and black when utilizing light of the backlight 20, by controlling application or non-application of voltage to the liquid crystal layer 3 in each pixel.

In addition, while the manufacturing cost of the liquid crystal display device can be reduced as described above because of use of the dielectric multilayered film as the transflective film 18, display can be uniformly performed on the entire surface within the display region (the region where the electrodes are formed) of the liquid crystal display device since coloring irregularities of light passing through the first electrode 5 are reduced by setting the film thickness of the first electrode 5 to 1800 Å so that the color of light passing through the first electrode 5 is a color in the blue region within the luminosity range. As described above, this effect is particularly remarkable in the configuration in which the transparent electrodes are formed directly on the dielectric multilayered film as in this liquid crystal display device.

That the same effect can be obtained even when the color of light passing trough the first electrode 5 is set to a color in the purple or red region within the luminosity range and that this invention is applicable to other various liquid crystal display devices are the same as in the first embodiment.

Figure 6:
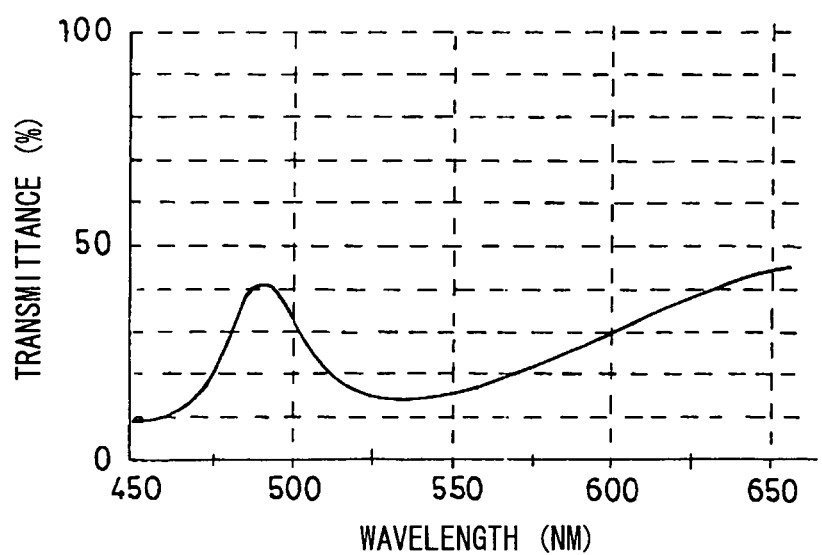
FIG. 6 is a similar graph showing spectroscopic characteristics in a case in which a transparent conductive film made of ITO is formed on a dielectric multilayered film.

Modification of Second Embodiment: FIG. 6

Next, a modification of the second embodiment will be described. FIG. 6 is a graph showing spectroscopic characteristics of a case in which a transparent conductive film made of ITO is formed on a dielectric multilayered film used in this liquid crystal display device.

From the simulation by the present inventors on the above-described liquid crystal display device of the second embodiment, the relation between the wavelength and transmittance in the case where the dielectric multilayered film used in this liquid crystal display device and an ITO film with a film thickness of 1800 Å are sequentially formed on a glass substrate and light generated by a D65 light source is applied thereto is as shown in FIG. 6.

A layered body of the dielectric multilayered film and the ITO film having such spectroscopic transmittance characteristics when formed on the glass substrate exhibits, by calculation, pale red with L* of 54.5, a* of 16.0, and b* of 6.72 in the CIE 1976 color system (exhibits complementary color to this color in the reflection case). This is in good agreement with the coloring of an actually fabricated liquid crystal display device. This coloring is different from that when an ITO film with the same thickness is formed on the glass substrate, because when the ITO film is formed directly on the dielectric multilayered film, the ITO film and the dielectric multilayered film exhibit a color as an integrated multilayered film, and thus the coloring is not one created by simply adding the color due to the ITO film and the color due to the dielectric multilayered film.

Therefore, in order to perform display not only without coloring irregularities but also in achromatic color with flat spectroscopic characteristics, it is necessary to correct, by the first light control layer on the visible side of the liquid crystal display panel 10', the coloring due to the constituting members in the liquid crystal display panel 10' such as the transflective film 18 composed of the dielectric multilayered film, the second electrode 6 composed of the ITO film, and so on during the reflection display.

For this purpose, in addition to the above-described function during the display, it is preferable to further provide a function of coloring correction of correcting the coloring of light emitted from the liquid crystal display panel 10' to make almost flat the spectroscopic characteristics within the visible region, that is, to make the spectroscopic by adjusting, for example, the retardation value or the placement direction of the slow axis 15a of the first retardation film 15. This arrangement can minimize the number of members to be provided, thereby reducing the cost.

Alternatively, it is also adoptable to provide another retardation film for coloring correction as a second light control layer.

In addition to the above, it is also possible to add a pigment to the first polarizing film 12 or to attach a color filter thereto to provide color thereto, so as to provide a function of coloring correction thereto.

Further, when the backlight 20 is provided to perform the transmission display as in this embodiment, it is necessary to correct the coloring during the transmission display due to the constituting members in the liquid crystal display panel 10' and the first light control layer, by the second light control layer on the opposite side to the visible side of the liquid crystal display panel 10'. This correction can be performed through use of the second retardation film 17, the second polarizing film 14, or another retardation film or the like as in the case of the first light control layer described above, and can be performed, in addition to the above, by adjusting the coloring of the light emitted from the backlight 20. The correction may be performed by combination of these members.

The arrangement described above can easily realize achromatic display without color irregularities. Further, in performing color display using color filters of red (R), green (G), and blue (B), setting of optical characteristics of each color filter for displaying an arbitrary color can be performed easily and accurately.

Note that the correction of coloring described above is similarly applicable also to the liquid crystal display device in the first embodiment.

Besides, while the achromatic dielectric multilayered film is used in the above-described liquid crystal display device of the second embodiment, it is also possible to give an arbitrary color to the reflected light or transmitted light by adequately adjusting the film thickness of each layer or the number of layers. It also applies to the case in which the dielectric multilayered film behaves as the integrated multilayered film, together with the ITO film formed thereon. Accordingly, it is also possible to realize achromatic display with almost flat spectroscopic characteristics by performing the above-described coloring correction through the adjustment of the film thickness of each layer or the number of layers of the dielectric multilayered film.

For example, the result of the simulation experiment by the present inventors shows that in the case where the dielectric multilayered film is formed in 2800 Å film thickness so that the color of passing light is a color in the red region within the luminosity range, when the second electrode 6 is formed on the dielectric multilayered film having the configuration shown in Table 1 used in this embodiment, the exhibited color is almost achromatic with L* of 61.9, a* of 0.27, and b* of 18.4 in the CIE 1976 color system.

Even in the case where the first electrode 5 is formed in 1800 Å film thickness so that the color of passing light is a color in the blue region within the luminosity range, the characteristics described above can be realized by adjusting the film thickness of each layer or the number of layers of the dielectric multilayered film.

Besides, when the color irregularities are reduced by setting the film thickness of the first electrode 5 formed on the first substrate 1 on the visible side to an appropriate value, the electrode and the dielectric multilayered film do not behave as an integrated multilayered film, but achromatic display can be realized by establishing the relation so that the color exhibited by the ITO film and the color exhibited by the dielectric multilayered film are complementary to each other in this case.

It should be noted that while the liquid crystal display device provided with the backlight 20 is described in the second embodiment, this is not an essential configuration. In addition, when the backlight is not provided, there is also no need to provide the second retardation film 17 and the second polarizing film 14 on the opposite side to the visible side of the liquid crystal display panel 10'.

Further, while the example in which the transparent electrodes are composed of ITO is described in the above-described embodiments, the invention is also applicable to the case in which the transparent electrodes are composed using other materials. However, when using a member with a refractive index greatly different from that of ITO, the optimal film thickness thereof will be different from those in the above-described embodiments.

INDUSTRIAL APPLICABILITY

As has been described, with the liquid crystal display device of the invention, the film thickness of at least one of the transparent electrodes formed on the first and second substrates is set so that the color of light passing through the transparent electrode is a color in the blue, purple or red region within the luminosity range, whereby coloring irregularities within the display region of the liquid crystal display device can be reduced and uniform display can be performed on the entire surface. This can improve the display quality of the liquid crystal display device.

This effect is particularly remarkable when the setting is applied to the liquid crystal display device having a configuration in which the transparent electrode is formed directly on the dielectric multilayered film.

In addition, achromatic display without color irregularities can be performed on the entire surface within the display region of the liquid crystal display device by employing the first light control layer to be provided on the visible side of the liquid crystal display panel, the second light control layer to be provided on the opposite side to the visible side, or the auxiliary light source which has characteristics to correct, into achromatic color, the coloring of the light which is emitted from the liquid crystal display panel caused by the transparent electrodes, the transflective film, or the like.

What is claimed is:

1. A liquid crystal display device comprising a liquid crystal display panel including a liquid crystal layer sandwiched between a first substrate on a visible side and a second substrate on an opposite side to the visible side having transparent electrodes on inner surfaces opposing to each other,
   wherein a transflective film formed of a dielectric multilayered film made by alternately layering a high refractive index film and a low refractive index film is provided between said second substrate and said transparent electrode on said second substrate,
   wherein at least one of said transparent electrodes formed on said first and second substrates is colored, and
   wherein spectroscopic characteristics within a visible region of a reflected light or a transmitted light by said transflective film are almost flat through correction of coloring of light transmitted through said at least one transparent electrode.

2. The liquid crystal display device according to claim 1, wherein a film thickness of said at least one of transparent electrodes is set so that light passing through said transparent electrode and exhibiting a maximum transmittance has a color within either a region defined by an x value of 0.22 to 0.28 and a y value of 0.21 to 0.31 or a region defined by an x value of 0.28 to 0.34 and a y value of 0.22 to 0.35 in a chromaticity diagram of a CIE 1931 color system using a white light source.

3. The liquid crystal display device according to claim 2, wherein a first light control layer having optical anisotropy is provided on an opposite side to said liquid crystal layer of said first substrate, and said first light control layer has a characteristic of correcting coloring of light emitted from said liquid crystal display panel to make spectroscopic characteristics thereof within a visible region almost flat.

4. The liquid crystal display device according to claim 3, wherein an auxiliary light source placed on an opposite side to said liquid crystal layer of said second substrate; and
   a second light control layer having optical anisotropy placed between said auxiliary light source and said second substrate, are provided respectively, and
   wherein either or both of said auxiliary light source and said second light control layer has/have a characteristic of correcting coloring of transmitting light emitted from a light source and transmitting through said liquid crystal display panel and said first light control layer to make spectroscopic characteristics within the visible region of the transmitting light almost flat.

5. The liquid crystal display device according to claim 2, wherein said at least one transparent electrode is a transparent electrode formed on said second substrate.

6. The liquid crystal display device according to claim 2, wherein said at least one transparent electrode is 1600 Å to 2000 Å in film thickness.

7. The liquid crystal display device according to claim 2, wherein said at least one transparent electrode is 2600 Å to 3000 Å in film thickness.

* * * * *